United States Patent [19]

Anderson

[11] Patent Number: 4,624,196
[45] Date of Patent: Nov. 25, 1986

[54] COMBINED SEED DRILL AND FERTILIZER APPLICATOR

[76] Inventor: Edwin V. Anderson, R.R. No. 1, Potlatch, Id. 83855

[21] Appl. No.: 764,209

[22] Filed: Aug. 9, 1985

[51] Int. Cl.⁴ .............................................. A01C 5/06
[52] U.S. Cl. ........................................ 111/52; 111/73; 111/85; 111/88; 172/464
[58] Field of Search ............... 111/18, 52, 52 WT, 54, 111/56, 59, 62, 63, 66, 69, 73, 77, 80, 85–88; 172/2, 7, 464, 471, 482, 491, 671; 222/352

[56] References Cited

U.S. PATENT DOCUMENTS

| | | | |
|---|---|---|---|
| 1,808,759 | 6/1931 | Bickerton | 172/464 |
| 1,934,298 | 11/1933 | Everson | 111/52 |
| 2,240,889 | 5/1941 | Hench | 172/471 |
| 2,241,633 | 5/1941 | Croce et al. | 111/86 |
| 2,383,373 | 8/1945 | Dewey | 172/671 |
| 2,750,862 | 6/1956 | Garmager | 172/464 |
| 2,869,490 | 1/1959 | Huber et al. | 111/73 |
| 3,108,552 | 10/1963 | Watson et al. | 111/52 WT |
| 3,144,843 | 8/1964 | Watson et al. | 111/52 WT |
| 3,494,427 | 2/1970 | Greig et al. | 111/66 |
| 3,533,475 | 10/1970 | Buchanan | 172/484 |
| 3,611,956 | 10/1971 | Moore et al. | 111/62 |
| 3,749,035 | 7/1973 | Cayton et al. | 111/62 |
| 4,044,697 | 8/1977 | Swanson | 111/73 |
| 4,078,504 | 3/1978 | Fye | 111/77 |
| 4,149,475 | 4/1979 | Bailey et al. | 111/85 |
| 4,307,822 | 12/1981 | Hardesty | 222/352 |
| 4,333,534 | 6/1982 | Swanson et al. | 111/85 |
| 4,338,872 | 7/1982 | Decker | 111/56 |
| 4,353,423 | 10/1982 | Poggemiller et al. | 172/464 |
| 4,377,979 | 3/1983 | Peterson et al. | 111/88 |
| 4,407,207 | 10/1983 | Dreyer | 111/88 |
| 4,416,335 | 11/1983 | Lofgren et al. | 172/2 |
| 4,506,609 | 3/1985 | Fuss et al. | 111/85 |
| 4,520,742 | 6/1985 | Anderson | 111/85 |
| 4,572,087 | 2/1986 | Brannan | 111/56 |

FOREIGN PATENT DOCUMENTS

| | | | |
|---|---|---|---|
| 511408 | 1/1955 | Italy | 111/73 |
| 581901 | 11/1977 | U.S.S.R. | 111/73 |

*Primary Examiner*—James R. Feyrer
*Attorney, Agent, or Firm*—Keith S. Bergman

[57] ABSTRACT

An agricultural seeder having a plurality of spaced openers for application of fertilizer in a seed row and at a spaced distance therefrom. The implement is supported for locomotion by a primary lower frame which in turn supports a secondary, vertically pivotable, upper frame. Hydraulic linkage communicates between the frame elements to move the upper frame relative the lower frame to raise applicators from the earth when necessary. The upper frame carries a plurality of spacedly arrayed openers and associated material applicators, which are hydraulically mounted to allow vertical adjustment and constant pressure depth maintenance.

6 Claims, 10 Drawing Figures

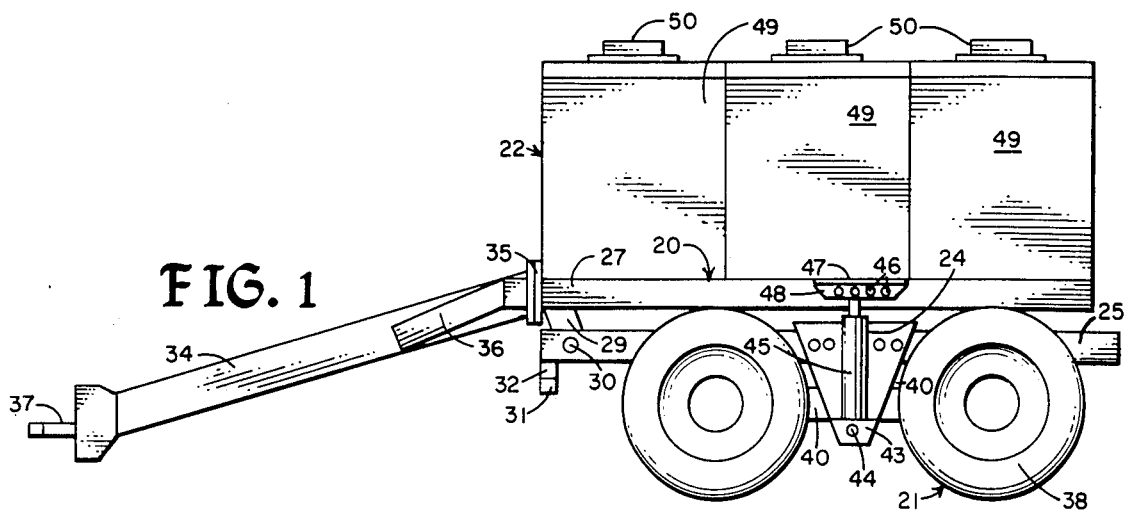
FIG. 1
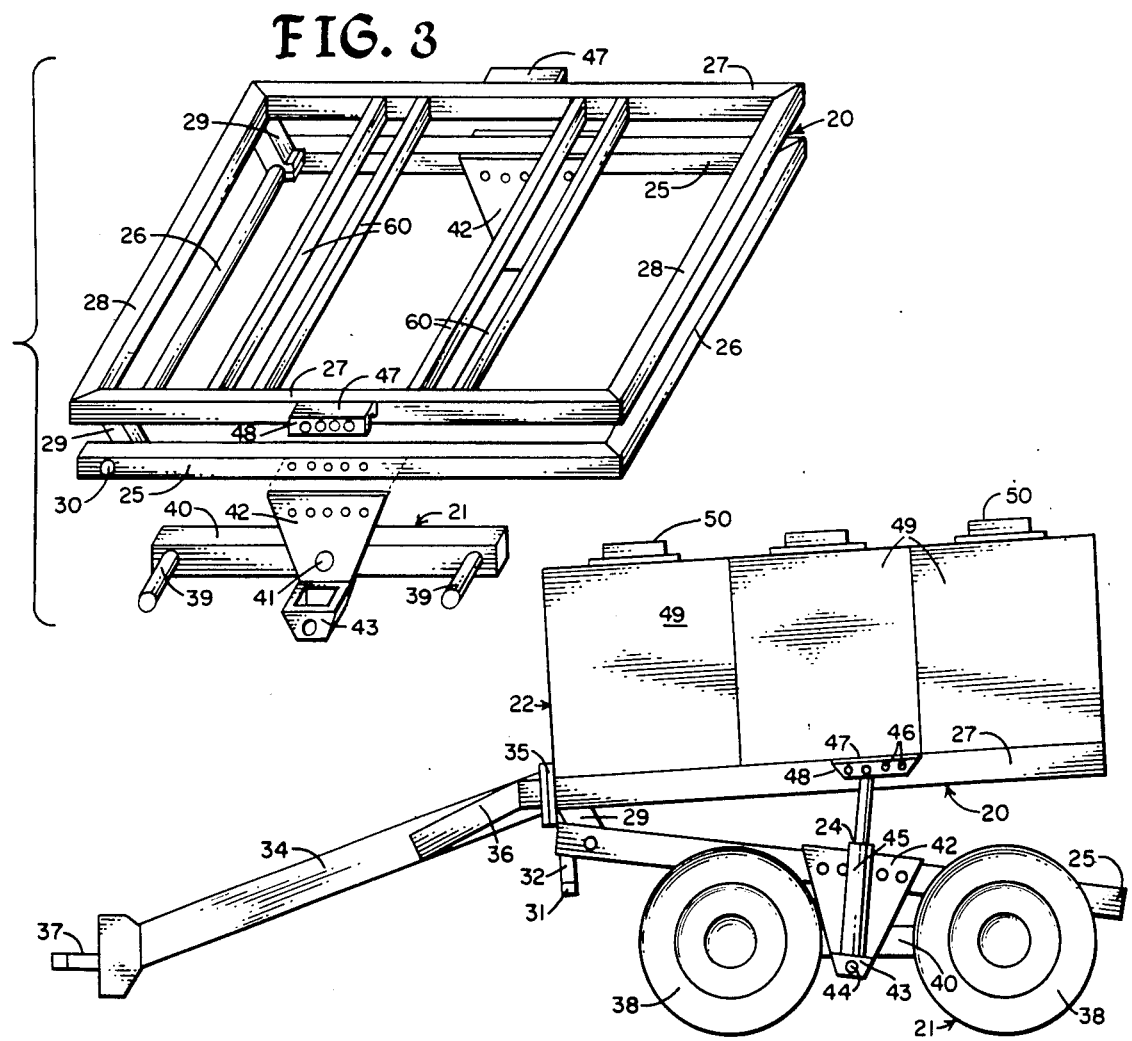
FIG. 3
FIG. 2

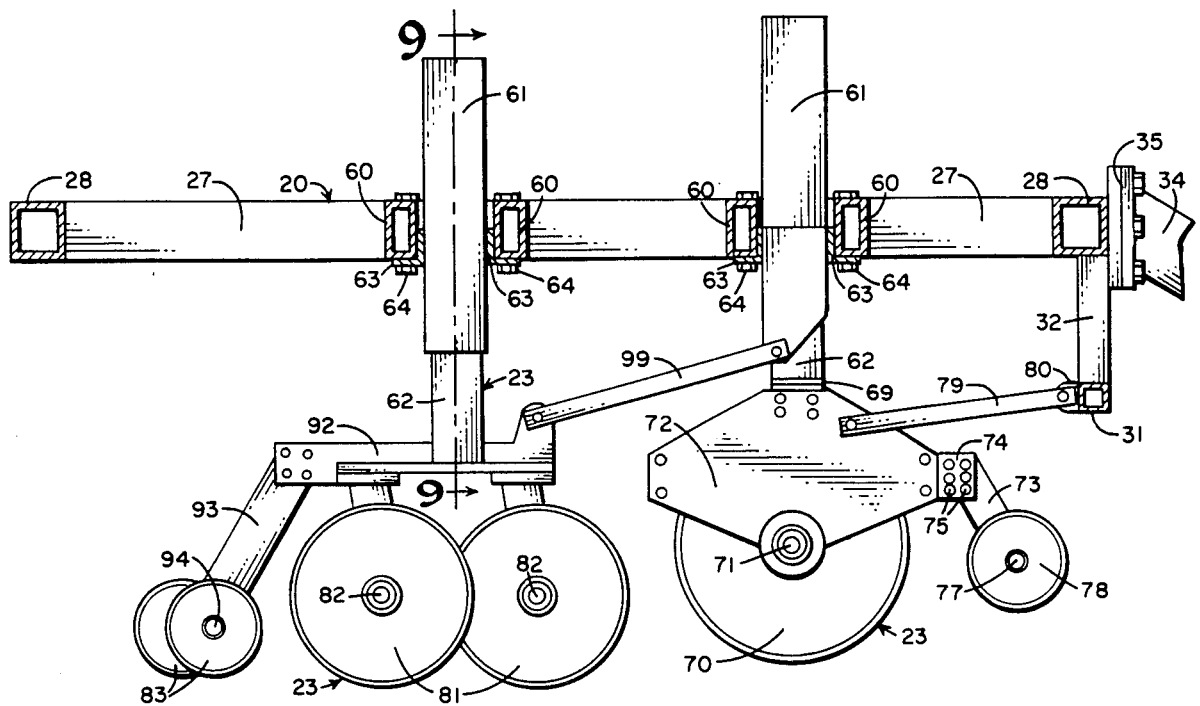
FIG. 6
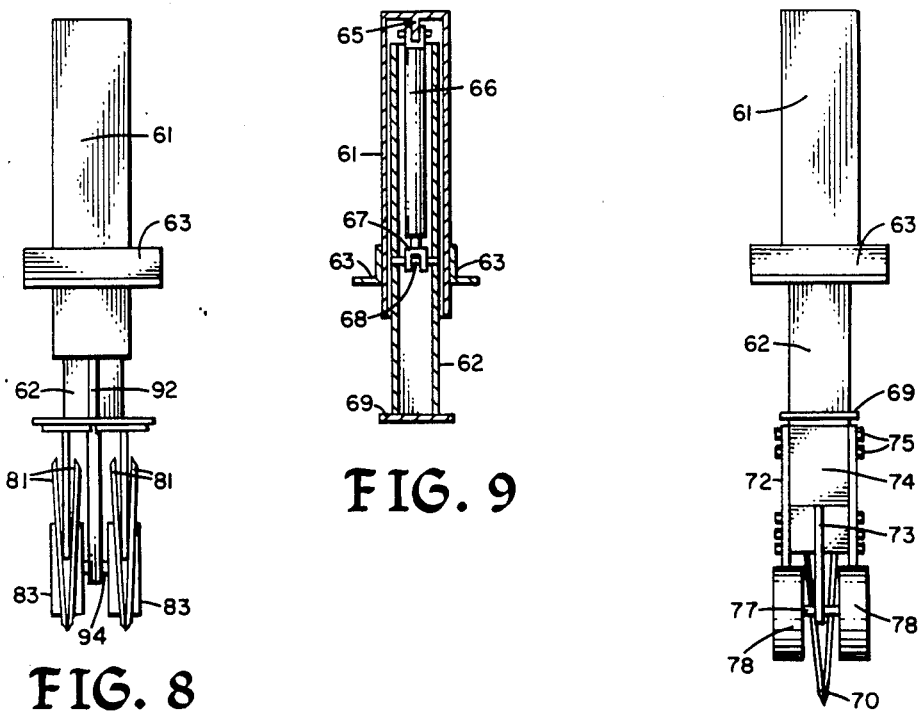
FIG. 7
FIG. 8
FIG. 9

COMBINED SEED DRILL AND FERTILIZER APPLICATOR

BACKGROUND OF INVENTION

Related Applications

There are no applications related hereto heretofore filed in this or any foreign country.

FIELD OF INVENTION

My invention generally relates to agricultural implements that combine seeding and fertilizing operations, and more particularly to such an implement that has a compound frame with a vertically movable portion carrying sets of hydraulically mounted applicator elements.

DESCRIPTION OF PRIOR ART

In cereal grain agriculture generally, and especially in such agriculture as carried on in the dryer portions of the western United States, it has become common to use a so called "no-till" or minimum tillage method of farming to eliminate unnecessary soil and moisture losses caused by traditional tillage. This type of farming is accomplished by use of chemical weed control to replace the traditional tillage operations for weed elimination. Seeds for a future crop are planted in standing stubble or prior crop residue without any special soil preparation or particular refinement of a seed bed. The advent of the no-till type of farming required development of specialized seeding devices and responsively various seed drills have been developed to properly deposit seeds in the no-till environment. These same devices generally are effective and may also be used with the trashy fallow method of farming.

Substantially contemporaneously with and as an adjunct to no-till farming, it became popular and sometimes almost necessary to apply fertilizer with precise positioning in or about the seed bed during the seeding operation. This type of fertilizing, again, has required particular specialized apparatus generally associated with a seed drill. My invention provides a new and novel member of this class of agricultural implement.

In general, seed drills for use in no-till or minimum till farming must be more massive, stronger and more durable than traditional seed drills heretofore used on a well and finely prepared seed bed. Most cereal grain seeds are quite sensitive as to their depth of placement and covering in the seed bed and this sensitivity must be reasonably satisfied to obtain germination and an effective plant stand from such seeds. To satisfy this requirement, seed drills must generally be supported by a vehicular structure of sufficient mass that the applicators might react against the implement to maintain vertical position in the soil when they be acted upon by various products of surface residue. The applicators themselves must be of substantial strength, rigidity and durability to react against residue and debris to maintain position with some reliability. Fertilizer applying elements must not only fulfill these criteria but also must generally be positionable at a spaced distance from seed applicators so that they might apply fertilizer at a distance from a seed bed. Often a plurality of fertilizer and seed applicators are associated with each other in sets so that side bands of fertilizer may be established in various spaced parallel arrays relative to seed rows. This requirement dictates that the vehicular framework supporting seed and fertilizer applicators have some substantial areal extent with a network of sub-frame elements to allow not only multiple row seeding but also the appropriate spatial relationship of the various seed and fertilizer applicators relative to each other.

Agricultural implements embodying these structures in general have heretofore become known. My invention provides an improved implement of such type.

My implement has a compound frame with a lower frame element providing locomotive support and the pivotably interconnected upper frame element providing support for the applicator elements so that they might be vertically moved, as a unit, into and out of the earth. Hydraulic linkage communicates between frame elements to adjustably move the upper frame relative to the lower frame.

Each fertilizer applicator and each pair of seed applicator elements are carried by hydraulic cylinders that are supported on the upper frame for adjustable positioning in a horizontal plane. Each applicator element provides depth regulation by reason of constant pressure in its supporting cylinder which cooperates with depth gauge wheels on the applicators to maintain the applicator elements at a predetermined depth in the earth.

My compound frame structure allows the applicator elements to be withdrawn from the earth while still maintaining a predetermined hydraulic pressure upon those elements so that they might immediately commence functioning when they are again moved to their functional position with opening disks under the earth's surface. Implements known in the prior art that have used hydraulic pressure to maintain applicator elements in the earth have generally required that the pressure on those elements be relieved when they be raised to allow cornering the implements. This has required re-establishment of pressure in the hydraulic cylinders regulating the applicators' functioning, which, in turn, has required a delay in reestablishing the elements in the earth after a turn, all to result in less uniformity and regularity of operation than with my implement.

My implement provides a metering wheel, that regulates the amount of material deposited, which is hydraulically controlled and mechanically related to the other structures of the implement so that it is raised before the applicator elements are raised and it is lowered before the applicator elements are lowered, especially in turning operations, so that materials are not improperly or unnecessarily applied when and where they are not wanted.

My invention differs from the prior art, not in any single structure or function described per se, but rather in the unique synergistic combination of all of its structures and functions to create the entire implement described and claimed.

SUMMARY OF INVENTION

My invention provides a combined seed drill and fertilizer applicator having a compound frame of substantial areal extent. A lower frame element carries wheels to support the implement for locomotion and pivotably supports an upper frame element that carries a plurality of seed and fertilizer applicators in depending, adjustably positionable array. The upper frame element carries operative mechanism and material storage bins. Adjustable hitch structure provides for releasable linkage of the implement to a propelling vehicle.

Hydraulically activated linkage communicates between the upper and lower frame elements to adjustably move the upper element and in turn raise the applicators from the earth. Applicators have depth regulating wheels and are hydraulically mounted on the upper frame for vertical motion. An hydraulic system provides adjustable, constant pressure upon the applicators to maintain constant depth in the earth. An hydraulically controlled regulator wheel regulates material dispersement responsive to the distance traversed.

In providing such an implement it is:

A principal object to create a seed and fertilizer applicator that has plural applicator elements suspended by hydraulic linkage that provides a constant downward pressure thereon to provide depth maintenance.

A further object of my invention to provide such an implement that has a compound frame with a lower frame element supporting the implement for locomotion, an upper frame element carrying the applicators and hydraulic linkage communicating therebetween to raise the upper frame and consequentially the applicator elements.

A still further object of my invention to provide such an implement that has a ground contacting measuring wheel, to regulate material dispersement, with hydraulic linkage that raises the wheel before raising the applicator elements and lowers it after lowering the applicator elements.

A still further object of my invention to provide such an implement that is of new and novel design, of rugged and durable nature, of simple and economical manufacture and one otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings, as is required.

BRIEF DESCRIPTION OF DRAWINGS

In the accompanying drawings which form a part hereof and wherein like numbers of reference refer to similar parts throughout:

FIG. 1 is an orthographic side view of the frame structure of my implement, with the upper frame in lowered operative position, to show its various elements, their configuration and relationship.

FIG. 2 is a similar orthographic side view of the same structure as illustrated in FIG. 1, but with the upper frame element in raised position.

FIG. 3 is an isometric view of the partially assembled frame of my implement showing various essential elements, their configuration and relationship to each other.

FIG. 6 is an enlarged orthographic side view of the detail of a longitudinally related set of seed and fertilizer applicators.

FIG. 7 is an enlarged orthographic front view of the fertilizer applicator of FIG. 6.

FIG. 8 is an enlarged orthographic front view of the seed applicators of FIG. 6.

FIG. 9 is a vertical cross-sectional view through the applicator structure of FIG. 8, taken on the line 9—9 thereon, in the direction indicated by the arrows, to show particularly the hydraulic linkage.

DESCRIPTION OF THE PREFERRED EMBODIMENT

Figure 4:
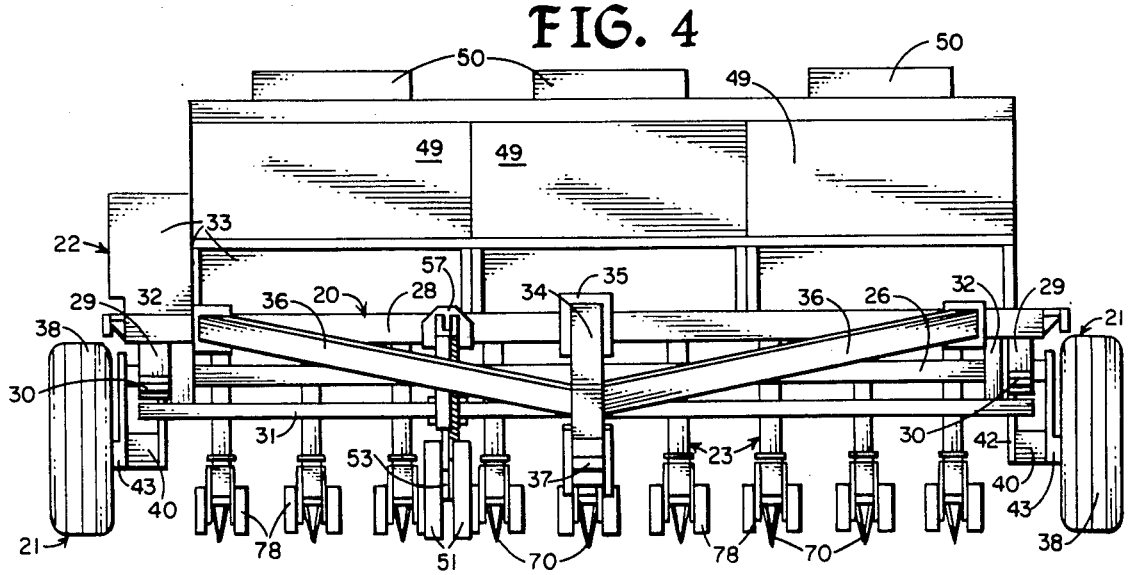
FIG. 4 is an orthographic front view of the implement of FIG. 1 fully assembled to show its various elements from this aspect.

My invention generally provides frame 20 carrying wheel structure 21 for locomotion and supporting material storage system 22 and dispersement system 23. Hydraulic system 24 powers the various other systems of my invention.

Frame 20, as seen especially in the partial, expanded view of FIG. 3. A peripherally defined, rectilinear lower frame element is formed by structurally interconnected similar channel type side beams 25 and rear beam 26 and front cylindrical beam 26. Peripherally similar upper frame element is formed by structurally interconnected side beams 27 and front and rear crossbeams 28. The upper frame is interconnected to the lower frame by similar forwardly and laterally positioned depending pivot arms 29. These pivot arms carry bearing caps 30 in their lower portions for support on forward lower frame beam 26 to provide a pivotable interconnection of the upper and lower frame elements in their forward parts. Disperser supporting crossbeam 31 is carried by vertical supports 32, depending from structural communication with the upper frame element in its forwardmost part, to support seed disperser support arms hereinafter described. Various subframe elements 33 are carried by both upper and lower elements of the frame structure to support various elements of my implement, but neither their structure nor function are remarkable and all may be appropriately created and positioned by a mechanic reasonably skilled in the agricultural implement arts. As appropriate, various of these subframe elements will be further specified hereinafter.

Tongue beam 34 extends forwardly and downwardly from structural interconnection with the medial portion of upper frame forward crossbeam 28. This structural joinder is accomplished by the bolted interconnection of similar adjacent fastening plates 35, each structurally carried respectively by the crossbeam and the tongue beam. Angled braces 36 communicate from the medial portion of the tongue beam to the lateral portions of upper frame crossbeam 28 to provide additional strength and rigidity. The forwardmost portion of the tongue beam structurally carries hitch 37 of a type heretofore known and used on heavier agriculture implements to releasably interconnect an implement to some type of prime mover (not shown) for locomotion.

The upper frame element is supported at a spaced distance above the lower frame element, as illustrated particularly in FIGS. 1 and 3. Pivotal support is provided in the forward portion of the frames by lateral pivot arms 29. In its lowermost position the upper frame should be substantially parallel to the lower frame.

The various elements of the frame of my implement are preferably formed of peripherally defined metallic beams of rectilinear cross section, except as otherwise specifically indicated, for appropriate strength and rigidity. The elements are mechanically interconnected at permanent joints by welding or riveting and at releasable joints by traditional bolting, with aid of auxiliary connection plates if necessary.

Wheel structure 21 provides similar mechanisms carried on the medial portion of each side of my implement to support it for locomotion. Each wheel structure provides tandem wheels 38 journaled on jack axles 39 carried by each end part of wheel beam 40. The wheels 38 illustrated are of pneumatic type though obviously not necessarily so. Wheel beam 40 is pivotably mounted on pivot pin 41 extending therethrough and between similar opposed, vertically depending wheel beam shackles 42. The upper portions of these wheel beam shackles are releasably connected by bolting through plural spaced holes to the medial part of lower frame side beams 25 to support the wheel structure thereon. The interconnection of the shackles with the lower frame side beam is releasable and adjustable so that the shackles might be moved in a forward or rearward direction when desired or necessary to balance a load carried by my implement relative to the wheel structures, especially to allow appropriate hitching and operation of the implement. The tandem wheels allow the carrying of heavy loads and the walking beam still allows substantial vertical adjustment of the wheels for the traverse of irregular terrain.

The lower portion of the laterally outward wheel beam shackle 42 of each wheel structure provides laterally extending cylinder fastening bracket 43 to carry pin 44 which pivotably interconnects the lower end of hydraulic raising cylinder 45. The upper end of each raising cylinder is pivotably carried on pin 46 supported in upper hydraulic cylinder bracket 47 having portion 48 extending laterally outwardly and defining plural spaced holes to adjustably carry the connecting pin 46 and allow interconnection with the hydraulic cylinder. The upper cylinder bracket 47 is mechanically fastened to the medial portion of the upper frame side beams 27. The pivotable connection of the raising cylinders allows relative motion of the various supporting frame elements and adjustable positioning of those elements for appropriate support and balance.

With this structure hydraulic raising cylinders 45 may be extended to pivotably raise the rearward portion of the upper frame relative to the lower frame, since the two frame elements are pivotably interconnected and the lower frame is supported on an underlying supporting surface against any vertical displacement. The vertical lift of the upper frame need be only sufficient to remove the dispersement elements from the underlying earth surface during turning operations or travel activities. Since some substantial weight is normally supported by the upper frame, the hydraulic structure interconnecting the two frames must be of appropriate strength and rigidity to move the masses required to be moved by it.

Material storage system 22 comprises a plurality of bins or tanks 49 supported by upper frame 20. These containers, which may comprise two or more units as desired, carry a supply of seed and various fertilizers. Each bin is accessed from removable top 50 and appropriately configured and positioned so as not to interfere with the other elements of my implement. The structure of these containers is not remarkable in view of the prior art and they are, therefore, not described or illustrated in any particular detail. It is to be noted, however, that since the upper frame has substantial areal extent, this, coupled with a heavy frame structure allows storage containers of both substantial horizontal area and vertical extent to allow material storage volumes generally greater than those provided by other similar implements of the prior art.

Material dispersement system 23 comprises two portions, the first to receive bulk material from the storage system and convey it to the dispersing elements, and the second the dispersing elements themselves which provide for placement of material in the soil beneath the implement. The system that receives material from bulk storage and conveys it to the ultimate dispersing elements is known in the prior art and is therefore not illustrated as it is not a novel part per se of the instant invention.

Figure 5:
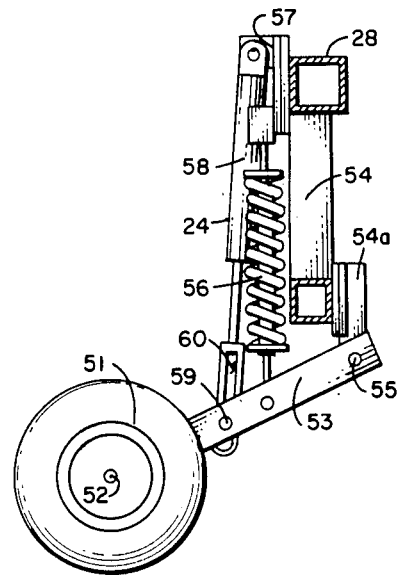
FIG. 5 is an enlarged, partial orthographic view of the measuring wheel structure of my invention, showing particularly the mounting and moving mechanism associated with the wheel.

Regulation of material to be passed through the dispersement system is determined by travel of measuring wheel 51 over the earth therebeneath. This measuring wheel is carried in a forward medial position on my implement so that it will not be significantly influenced by travel of one of the lateral portions of the implement more than the other as on hills or in turning. As shown particularly in FIG. 5, measuring wheel 51 is journaled on axle 52 carried by measuring wheel arm 53 which is pivotably supported on depending subframe element 54 structurally carried by the medial portion of forward crossbeam 28 of the upper frame element. The measuring wheel arm is pivotably connected by bracket 54a carried by the lower portion of this subframe element. Shock absorber 56 extends upwardly from pivotal interconnection with the medially rearward part of the measuring wheel arm to connecting bracket 57 carried by the forward facing surface of forward crossbeam 28 of the upper frame. The shock absorber and associated spring provide downward force to prevent slippage of the measuring wheel over the earth traversed while yet allowing the measuring wheel to follow the ground contour and irregularities therein. Measuring wheel hydraulic cylinder 58 communicates from cylinder pin 59 carried by the medial forward portion of the measuring wheel arm to connecting bracket 57 to raise and lower the wheel into and out of ground contacting position responsive to cylinder motion. Cylinder pin 59 is carried in slot 60 defined by the lower end of the cylinder piston rod to free the measuring wheel from the hydraulic force when lowered and allow appropriate action of the shock absorber.

The measuring wheel in the instant invention serves as a powering source for the dispersement system of my implement, as well as a measuring device, to cause dispersement of material in proportion to the distance traversed over a supporting surface. The particular dispersement system used in the instant implement is one heretofore known, and in fact patented in U.S. Letters Pat. No. 4,307,822 heretofore issued to Robert D. Hardesty. Rather than using a measuring wheel to directly drive a dispersement system, it is known in the prior art to use such wheel as a hydraulic regulator for a separately hydraulically powered dispersement system, and obviously this type of dispersement system might equally well be used with my invention, if desired. In either event the dispersement system disperses material through plural conduits (not shown) into the upper portion of the individual material dispersing elements from where the material is deposited by gravity. So long as a dispersement system provides this function, its particular details are not essential to my implement.

Individual dispersing elements are mounted on subframe beams 60 of the upper frame element, in the instance illustrated on paired, cooperating, spaced crossbeams seen in FIG. 6. There are illustrated two sets of such crossbeams in longitudinally spaced relationship. Normally this number and configuration of cross elements allows mounting of various individual dispersing elements in most arrays commonly used in modern agriculture. Obviously however, more or less subframe elements may be provided, if desired or required, and these elements may be variously arrayed other then as illustrated to provide particularly desired positioning of the dispersing elements.

Each dispersing element is carried by similar mounting structure illustrated particularly in FIG. 6, et seq. Smaller mounting shank 62 is slidably carried within a channel defined by a larger vertically oriented fastening shank 61. The dimensioning of the fastening shank is such as to fit between adjacent pairs of subframe beams 60. Cross sectionally the two shank elements 61, 62 preferably are rectangular channel elements for ease of fastening. The outer surface of the fastening shank structurally carries "L" shaped angle iron bracket 63 to fit on the adjacent subframe element 60 and provide means of releasably fastening the mounting shanks thereto. With this fastening system, each disperser element may be adjustably positioned on subframe elements 60 as desired. The releasable fastening of the angle iron brackets to the subframe elements is accomplished by bolting 64.

The fastening shank provides a top element supporting depending cylinder ear 65 which pivotably carries one end of hydraulic adjustment cylinder 66 by means of a pin extending therebetween. The piston shaft of the adjustment cylinder carries yoke 67 which in its end part is mounted on pin 68 carried between the opposite sides of mounting shank 62 at a spaced distance below the upper portion thereof. With this structure inner mounting shank 62 may be moved vertically relative to outer fastening shank 61 by operation of the adjustment cylinder. The mounting shank normally provides flange plate 69 in its lowermost part to allow ready fastening and removal of depending dispersing structures.

Neither seed nor fertilizer deposition structures of my invention are remarkable or unknown. Both structures, in essence at least, have heretofore been used in agricultural implements. The fertilizer dispersing structure is shown in side view in FIG. 6 and in front view in FIG. 7. It provides two angled cutter disks 70, each journaled on paired, opposed shafts 71 carried by the lower extensions of the fertilizer disk peripheral housing 72. This housing in turn carries in its forward part depending depth wheel mounting arm 73, adjustably mounted by bracket 74 on the housing by bolts 75 extending in threaded engagement therebetween. In its lower forward end portion the depth wheel arm journals laterally extending depth wheel jack axles 77 which journal depth wheels 78 having a peripheral surface of some width. These elements are so sized and configured, as illustrated, to allow the depth wheels 78 to contact the surface of the earth supporting the implement while the bottom portion of cutter disks 70 extends a predetermined distance therebelow, generally not more than five to six inches.

The upper forward portion of each fertilizer disk housing 72 pivotably mounts forwardly extending support bar 79, the forward part of which is pivotably carried by bracket 80 supported on seed disperser cross beam 31 of the upper frame to provide additional strength to resist rearwardly directed forces on the element.

The seed opener structure is illustrated in side view in FIG. 6 and in front view in FIG. 8. In the instance illustrated two similar sets of seed openers are shown, each set being supported by a single mounting structure. Each seed opener provides paired opposed opening disks 81 rotatably mounted on jack shafts 82 carried by the lower portion of depending mounting shank 62 which in turn structurally carries elongate mounting bracket 92. Each of the opening disks is angled slightly to each other so that they form a "V" configuration as illustrated, with their lowermost portions in immediate adjacency. The point of adjacency is preferably at an angle about twenty-five degrees forwardly of the vertical for ease of operation. The rear portion of mounting bracket 92 supports rearwardly depending depth wheel arm 93 which carries depth wheel jack axles 94 in its lower part to journal similar opposed depth gauging wheels 83 having a peripheral surface of some width. The depth wheel axles are preferably threaded, with the depth wheels themselves providing their own journal, to allow lateral adjustment of the wheels so that they might also act as packing wheels if desired. The depth gauging wheels will resist their downward displacement in the earth therebelow and thusly regulate the depth of penetration of the seed opener disks into the earth. A support 99 communicates between the lower portion of the forwardly adjacent fertilizer fastening shank to the forward portion of mounting bracket 92 to provide additional support and rigidity to resist rearwardly directed force.

With this structure, as the angled opener disks pass through the earth beneath its surface, they open a "V" shaped trench into which various seeds and fertilizer materials or other matter may be deposited. As the implement passes over the earth, the opened trenches tend to refill themselves by normal action of gravity to cover the material so deposited. The amount of covering will depend upon the nature of the soil and the depth of the openers therein. It is known to use packer wheels to traverse over or beside a course opened by the disk openers to compact the soil and complete the filling of the trench. My depth gauging wheels may fulfill this purpose if desired.

Figure 10:
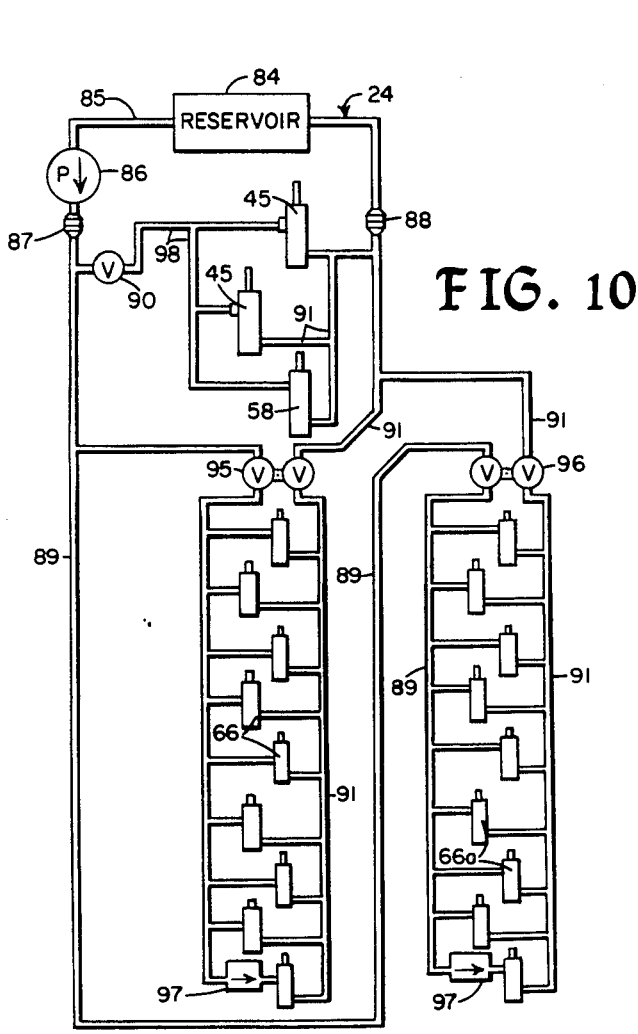
FIG. 10 is an hydraulic circuit diagram, in normal symbology, of the hydraulic system of my invention.

Hydraulic system 24 of my invention is shown in normal symbology in FIG. 10. Here hydraulic fluid from reservoir 84 passes through line 85 to pump 86 which pressurizes it for use. The reservoir and pump elements may be carried by my implement itself and the pump powered by some independent powering source. Most commonly, however, these elements will be provided by the hydraulic system of a propelling vehicle, such as an ordinary farm tractor, and its hydraulic systems will merely be interconnected at points 87, 88 with the remaining hydraulic system of my implement.

Pressurized fluid is supplied through manifold line 89 to three independent hydraulic circuits.

Frame lifting valve 90 communicates in series with manifold line 89 and thence through line 98 in parallel with the two frame lifting cylinders 45, which may be single acting cylinders that expand upon opening of valve 90, and measuring wheel cylinder 58 which again may be a single acting cylinder that contracts upon opening of valve 90 to raise the measuring wheel upwardly against its downward bias provided by shock absorber 56. Line 91 communicates from the return side of these cylinders to return hydraulic fluid to reservoir 84.

Since the three hydraulic cylinders of this circuit are interconnected in parallel, they will all be simultaneously supplied with the same pressurized fluid and since the load on the frame cylinders is much greater than on the measuring wheel cylinder, the cylinders will act in sequence. When the hydraulic circuit is activated the measuring wheel cylinder will retract before the frame cylinders and when the pressurized fluid is stopped the measuring wheel cylinder will lower after the frame cylinders.

Seed disperser shuttle valves 95 communicates with both pressurized input line 89 and return line 91 to open one line when the other is closed. The seed dispenser cylinders 66 communicate in parallel between these lines. With this arrangement then, when the input line is open the output is closed and constant pressure is maintained in all seeder dispenser cylinders.

Fertilizer disperser shuttle valves 96 communicate in similar fashion between the supply manifold line 89 and the return line 91 with the fertilizer disperser cylinders 66a in parallel therebetween. The valve action in this circuit is the same as described for the seeder disperser circuit.

Gas type accumulators 97 are provided in both disperser circuits to allow motion of the individual disperser cylinders to accommodate motion of those cylinders during operation to conform with the underlying surface being serviced. The control valves described are preferably physically located in the cab of a propelling tractor to allow ready and convenient control of my implement by the tractor operator.

Having thusly described the structure of my invention, its operation may be understood.

To use an implement formed in accordance with the foregoing specification, it is attached by its tongue to the hitch of a propelling tractor (not shown) for locomotion and to the tractor's hydraulic system for operative hydraulic pressure. The material storage system of the implement is provided with appropriate material to be dispersed. In this condition, if the material dispersement elements be not in a raised position, valve 90 is activated to operate frame raising cylinders 45 to raise the upper frame and thusly to move the disperser elements from contact with the earth therebeneath. The measuring wheel will also thereby be raised. The implement is then moved to the site of use by its attached prime mover.

When in proper position, seeder cylinder valve 95 and fertilizer applicator valves 96 are opened on the pressure side to maintain a predetermined constant pressure in the cylinders controlled by these valves, to ultimately maintain the opening structures at the proper depth in the earth. Thereupon the frame lifting valve 90 is closed to remove pressurized fluid from frame lifting cylinders 45 and thusly lower the upper frame element relative to the lower frame element by action of gravity to cause the seed and fertilizer opening elements to be inserted in the earth below the implement to the distance determined by the depth wheels associated therewith. The constant pressure maintained on the mounting shank of each of the opening devices will maintain them continuously at this depth during motion of the implement over the earth. Upon deactivation of the frame raising cylinders by closing the pressure line thereto and opening the exhaust line therefrom, pressure will be relieved from the measuring wheel cylinder and it will move downwardly into the contact with the earth therebeneath by reason of gravity and its downward mechanical bias. When the measuring wheel has so positioned, the implement is moved along a linear course to be serviced and during the implement's transit over this course, fertilizer and seed will be deposited in linear rows of predetermined array opened by the opening elements.

When the end of the first linear course is reached and it is desired to service an adjacent course, frame lifting valve 90 is activated to pass fluid through pressure line 98 to the frame cylinders 45 and measuring wheel cylinder 58. This causes the measuring wheel to lift firstly because of the substantially lesser force upon it than upon the frame cylinders. Thereafter pressurized fluid activates the frame cylinders 45 to cause the upper frame element to move upwardly relative to the lower frame element and thusly extract the disperser openers from the earth beneath the implement. The implement is then turned in the normal fashion by its prime mover and when aligned in the next course to be serviced, the applicator mechanism is again inserted into the earth and the measuring wheel lowered by closing valve 90 to cause the reverse of the aforesaid actions.

It is to be particularly noted that during the operation of my implement, since material dispersing elements are independently suspended, each may operate independently of the others, and therefore, if one element is forced out of the ground by earth or vegetative debris of one sort or another, this has no effect upon the positioning or operation of the other elements It is further to be noted from the structure of the frame of my implement that each of the applicator elements is releasably positioned and maintained thereon and may be arrayed in various desired positions to provide various seeding and fertilizing patterns such as may be desired in any particular instance. This allows application of fertilizer in a row of seed or on either side thereof, and at depths either above or below the seed bed, according to the particular farming practice desired.

It is to be further noted that the measuring wheel cylinder will raise before the frame cylinders and lower after them so as to allow the material disperser openers to be positioned in the earth before operation of the material dispersement system so that material will not be dispersed during turning operations or at other times when it may be wasted or not wanted It is further to be noted that with the hydraulic system described, constant pressure may be maintained upon individual disperser cylinders at all times during turning operation or otherwise, so that they operate immediately when they are lowered to an earth penetrating position. Since these cylinders are not used to raise or lower the dispersers into and out of an operating position, there is no time delay in building up pressure in the operating hydraulic system after they have been lowered.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and what I claim is:

1. In an agricultural seeder and fertilizer applicator having a plurality of seed disperser and fertilizer disperser elements, means for carrying a supply of material to be dispersed, and means of dispersing material to the plurality of disperser elements, the invention, comprising, in combination:

a compound frame having a lower frame element supported for locomotion over an underlying surface and an upper frame element thereabove pivotably communicating with the forward portion of the lower frame element with hydraulic means communicating between the upper and lower frame elements to raise the upper frame element relative to the lower frame element, each frame element having subframe structure to support applicator components;

a plurality of material dispersement elements with lowermost cutter disks each dispersement element having an upper fastening shank defining a medial channel extending therethrough and carrying a depending mounting shank for slidable motion in said channel, each said mounting shank defining an internal channel with an hydraulic cylinder carried in the upper portion of the fastening shank channel and in the mounting shank channel to interconnect the fastening shank and mounting shank and slidably move each associated set of the said shanks relative to each other and hydraulic powering means to move the upper frame element relative to the lower frame element and to move the fastening shank of each dispersement element relative to the associated mounting shank.

2. The invention of claim 1 further characterized by:

a measuring wheel journaled on an arm pivotably mounted on and extending forwardly and downwardly from a medial forward portion of the lower frame element, said arm being biased to a first downward position wherein the measuring wheel contacts an underlying surface supporting the implement and being movable by hydraulic means to a second upward position wherein the measuring wheel is at a spaced distance above a surface supporting the implement and an hydraulic system having valve means to, in a first position, lower the upper frame element relative to the lower frame element and thereafter lower the measuring wheel to its first position and, in a second position, raise the measuring wheel to its second position and thereafter raise the upper frame relative to the lower frame, all while maintaining constant pressure on each of the dispersement element cylinders.

3. The invention of claim 1 further characterized by:

each of the dispersement element mounting structures carrying a depending depth wheel of some peripheral area, bearing on a surface beneath the applicator within which the cutter disk of the dispersement element projects, to create resistance to further downward displacement to regulate depth of penetration of the dispersement element cutter disk into that underlying surface.

4. In a combination agricultural implement for drilling seed and applying fertilizer, the invention comprising, in combination;

a compound peripherally defined beam-type frame having a lower frame element carrying tandem wheels on each of its medial lateral portions for support and locomotion and a similar peripherally defined upper frame element, pivotably interconnected with the lower frame element and extending angularly upwardly thereabove, each frame element having subframe members to mount implement parts;

hydraulic means communicating between the upper frame element and the lower frame element to pivotably raise the upper frame element relative to the lower frame element;

a plurality of material dispersement elements carried in spaced array by subframe members of the upper frame, each of said material dispersement elements having an upper mounting shank releasably carried on the upper frame element and defining a vertically orientated internal channel slidably carrying therein a depending mounting shank defining a medial channel carrying in its lowermost portion disk opener means and at least one depth gauging wheel, and an hydraulic cylinder partially carried in each shank channel and communicating between the mounting shank and the fastening shank to move the two shanks relative to each other, and hydraulic means for operating said hydraulic cylinders, storage means for carrying material to be dispersed, dispersement means for transporting stored materials to the dispersement elements and dispersing them thereto and means for attaching the implement to a prime mover.

5. The invention of claim 4 further characterized by:

the material dispersement means including a measuring wheel journaled on a wheel arm pivotably mounted on the forward medial portion of the lower frame element and biased to a first downward, earth contacting position but movable by hydraulic means to a second raised position with the measuring wheel at a spaced distance above the earth therebeneath.

6. The invention of claim 4 further characterized by:

an hydraulic system having valve means with a first state to cause the measuring wheel cylinder to raise the measuring wheel and thereafter to cause the frame cylinders to raise the upper frame relative to the lower frame and a second state to cause the measuring wheel to lower to a second earth contacting position and thereafter to lower the upper frame element relative the lower frame element to position the dispersement elements in the earth beneath the implement, all while maintaining constant operative pressure on each of the dispersement element cylinders.

* * * * *